MAGNETIC TRANSDUCER HEAD ASSEMBLY WITH OFFSET POLE PIECES

Filed Oct. 6, 1964

INVENTORS
WILLIAM T. FROST
E. TROY HATLEY

BY

ATTORNEY

United States Patent Office 3,384,881
Patented May 21, 1968

3,384,881
MAGNETIC TRANSDUCER HEAD ASSEMBLY WITH OFFSET POLE PIECES

William Thomas Frost, Los Gatos, and Elbert Troy Hatley, San Jose, Calif., assignors to International Business Machines Corporation, New York, N.Y., a corporation of New York Filed Oct. 6, 1964, Ser. No. 401,943
8 Claims. (Cl. 340—174.1)

ABSTRACT OF THE DISCLOSURE

An electromagnetic transducer for increased density in the tracking dimension is obtained despite limitations in presently available materials by offsetting the pole pieces in the tracking dimension to reduce the width of contiguous gap faces to a transverse dimension substantially less than the breadth or transverse dimensions of the pole pieces themselves.

The invention relates to electromagnetic transducers, and it particularly pertains to such transducers for recording in and reproducing from narrow magnetic record tracks.

Present-day electromagnetic structures, materials, and techniques enable the electromagnetic storage of binary data bits at linear packing densities of ten thousand bits per inch, but the packing density in the direction transverse to the linear direction, commonly referred to as the "tracking" dimension, is limited to one hundred tracks per inch resulting in an areal packing density of one million bits per square inch. Obviously, the capabilities of recording and reproducing in the tracking dimension fall far behind the capabilities in the linear dimension. Since present day mangetic recording media is usable at resolutions of ten million bits per square inch and higher, there is definite indication that electromagnetic transducers with decreased tracking with capabilities are in order.

It is an object of the invention to provide an electromagnetic transducer for recording in and reproducing from a narrower magnetic track than is possible with conventional transducers.

It is another object of the invention to provide an electromagnetic transducer of such narrow track width capabilities, utilizing present day techniques for achieving short gap length resolution, thereby maximizing the areal packing density.

It is a further object to provide ways and means for more economical and more accurate manufacture of such electromagnetic transducers according to the invention.

According to the invention, increased density in the tracking dimension is obtained despite limitations in presently available materials by offsetting the pole pieces of a transducer in the transverse or tracking dimension to reduce the width of contiguous gap faces to a transverse or tracking dimension substantially less than the breadth or transverse dimensions of the pole pieces.

Further according to the invention, a narrow track electromagnetic transducer comprises a magnetic core element, a winding about the core element, and a pole shoe of at least two pole piece elements magnetically and mechanically coupled to the core element. The pole pieces are spaced apart in the longitudinal direction of the transducer in conventional manner and offset, according to the invention, in the transverse dimension to reduce the contiguous pole face dimensions or gap width to a transverse dimension substantially less than the transverse dimension or breadth of the pole pieces.

Still further according to the invention, the operation of such a transducer as described is substantially enhanced by employing magnetic flux restricting conductor pieces on alternate sides of the pole piece elements.

Still further according to the invention, the flux constraining pieces are extended in the direction of the gap length dimension to delineate the width of the gap.

The cost of manufacture of the pole pieces according to the invention is materially reduced in another aspect of the invention by bonding together a plurality of bars of readily machined and lapped material in a precise arrangement and thereafter slicing the assembled bars in a plane parallel to the plane of the pole faces. The latter operation is low in cost compared to the relatively expensive cost of assembling the bars and bonding them, whereby the overall cost of the manufacture is not prohibitively larger than the cost of the prior art transducers.

In order that the several advantages of the invention may be readily obtained in practice, preferred embodiments of the invention, given by way of example only, are described hereinafter with reference to the accompanying drawing forming a part of the specification and in which.

Figures 1, 2, 3, 4:
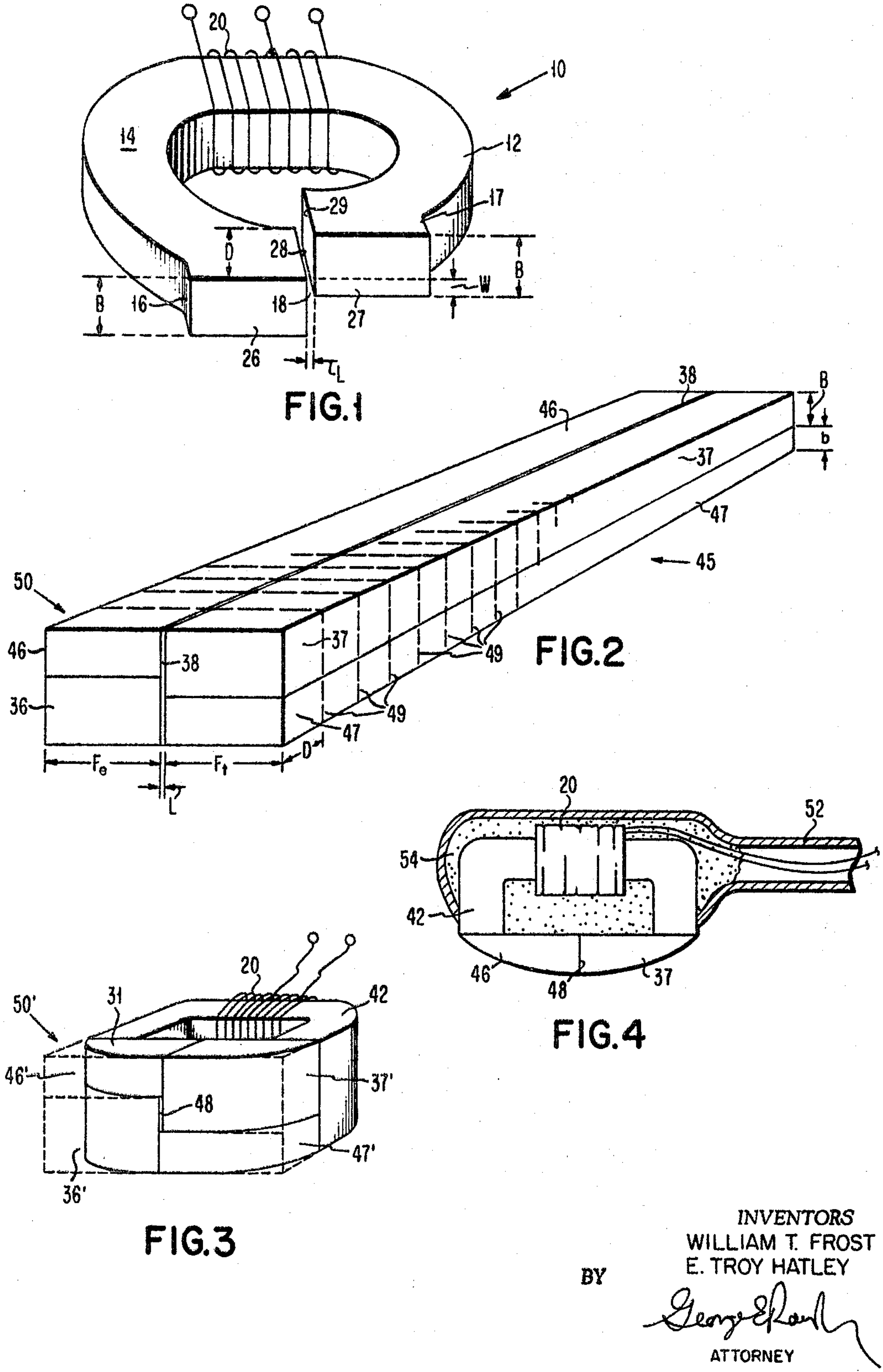
FIG. 1 is a schematic illustration of the basic structural arrangement of an electromagnetic transducer according to the invention.
FIG. 2 shows the arrangement of materials of one embodiment of the transducer according to the invention in one step of the manufacture thereof.
FIG. 3 shows the arrangement of materials of a similar but different embodiment according to the invention in the following step in the manufacture thereof.
FIG. 4 is an elevation view of an embodiment of an electromagnetic transducer according to the invention in a practical application thereof.

FIG. 1 schematically depicts an electromagnetic transducer 10 according to the invention in its most basic form. A substantially annular magnetic member 12 comprises a core element 14 and two pole piece elements 16 and 17 having a gap 18 arranged therein and a winding 20 arranged thereon. Preferably the gap faces 28 and 29 are parallel to each other so that the gap dimensions do not change with wear of the magnetic member 12 at the pole faces 26 and 27. The pole piece elements 16 and 17 have pole faces 26 and 27, respectively, arranged in the same plane, shown here as being in the plane of the paper, and gap faces 28 and 29 which are normal to the plane of the pole faces and to the length L of the gap. As is customary in the art, the distance L between the gap faces is denoted the length of the gap since it is in the lengthwise dimension of the movement of the recording medium relative to the transducer 10. The axial dimension or breadth B of the core member 12 of the pole piece elements 16 and 17 (and, consequently, the transverse dimension of the pole faces 26 and 27) because of limitations of the materials presently available is too large for recording in the track width desired.

According to the invention, pole piece elements 16 and 17 are offset with respect to each other, and in the integral embodiment shown, the core element 14 is warped accordingly to reduce the width of the pole faces 28 and 29 to the dimension which can be considerably less than the breadth B. In practice, the pole pieces are offset to leave pole faces of smaller width (W' not shown) so that the spreading flux will leave a recorded track no wider than the desired width W. Further according to the invention, the flux may be confined to the dimensions W by the use of flux guiding conductor pieces more completely described hereinafter. The resultant magnetic track as recorded will be of the same width W. While an electromagnetic transducer according to the invention can readily be made in accordance with the showing in FIG. 1, more practical embodiments are described hereinafter. Preferably, an electromagnetic transducer according to the invention comprises at least two separate parts: a core and a pole shoe. The pole shoe is built up of at least two pole pieces separated by a gap spacer and also preferably comprises flux guiding pieces for confining the flux within the dimensions of the gap.

FIG. 2 illustrates an assembly of material at one step in the fabrication of an electromagnetic transducer according to the invention. Two bars 36 and 37 of cross-sectional dimensions of the desired poles pieces of magnetic material are cemented, as for example with epoxy cement, to similar bars 46 and 47 of non-magnetic material having a co-efficient of expansion and other mechanical properties similar to those of the magnetic bars 36 and 37. The bars 36 and 46 are cemented together as snugly as possible as are the bars 37 and 47. The bars 36 and 37 may be of any of the well-known magnetic alloys used for this purpose, such as those known by the trademarks Hy-Mu 80, Alfenol, Sendust, or they maybe of ferrite. The bars 46 and 47 may be non-magnetic insulating material, such as a ceramic or other insulating material. Preferably, bars 46 and 47 are of conducting flux confining material such as copper, brass, aluminum, or the like. The two sub-assemblies 36–46 and 37–47 are then spaced apart and joined together by means of a non-magnetic gap filler 38. The gap spacing L is equal to the gap length of the desired electromagnetic transducer. A dimension of the order of fifty microinches is readily obtained for an electromagnetic transducer as described herein. The gap filler may be brass, copper, platinum, mica, silicon monoxide, glass, or other materials of known application. A suitable glass gap filler and joiner is described in U.S. Patent 3,024,318, issued to Simon Duinker and Jules Bos which also describes ferromagnetic materials. Precision lapping and alignment of the bars 36, 37, 46, 47 and the spacer 38 are required in fabrication of the assembly 50. These operations, of course, tend to increase the cost of manufacture to some extent, but the additional cost, however, is offset by precisely jigging long bars in one operation and next slicing the assembly 45 along the parting lines 49 to form a large number of blanks 50 approximately 20 milli-inches in depth D. This latter operation is not particularly precise in nature and, therefore, tends to reduce the overall expense.

A subsequent step in rendering one of the blanks 50 or a slightly different blank 50′ according to invention is shown in FIG. 3. Here the flux restraining pieces 46′ and 47′ are longer by a dimension equal to the length of the gap so that the gap filler material is confined centrally of the core in a smaller gap spacer 48. Otherwise, the two embodiments are alike. This latter arrangement enables even better control of the diverging flux than otherwise would be possible. As shown, the blank 50′ is shaped in one dimension to form a rounded pole shoe, and it is contemplated that some shaping in the breadth of the blank 50′ will be preferred, although none is shown in the drawing. A complete electromagnetic transducer comprises the pole shoe formed of the blank 50 and a magnetic core 42 of convention material and structure with a conventional winding 20 arranged thereabout, as shown. A track width of the order of 0.0005 inch and a gap length of the order of 0.00005 inch is readily attainable according to the invention to provide recording of the order of 10,000,000 bits per square inch with material of breadths of the order of 0.018 to 0.010 inch.

FIG. 4 is an elevation view of a completed electromagnetic transducer according to the invention illustrating the compact assembly that is possible. The transducer is potted in an access arm 52, for example of the type shown in U.S. Patent 3,051,954, issued to Alfred G. Osterlund, by conventional means such as epoxy cement 54.

While the invention has been described in terms of a plurality of preferred embodiments, it should be clearly understood that those skilled in the art will make changes in form and material without departing from the spirit and scope of the invention as defined in the appended claims.

The invention claimed is:

1. An electromagnetic transducer comprising:
a magnetic core,
a winding about said magnetic core, and
a pole shoe,
said pole shoe having a substantially rectangular face and comprising
two pole pieces of magnetic material of given breadth and length, and
two other pieces of non-magnetic material of predetermined breadth substantially less than said given breadth and of predetermined length, and
a spacer piece of non-magnetic material separating said pole pieces and forming a transducer gap therebetween.
said poles pieces being arranged in diagonally opposite corners of said rectangular face in magnetically coupling arrangement to said magnetic core and with respect to each other forming said transducer gap of width equal to the difference between said given and said predetermined breadths.
said other pieces being arranged in the remaining diagonally opposite corners of said rectangular face and along side said pole pieces,
whereby said transducing gap is effective for transducing electric and magnetic energy within a transverse dimension of said pole shoe substantially less than said given breadth of said pole pieces.

2. An electromagnetic transducer as defined in claim 1 and wherein
said two other pieces are of electric conductive material.

3. An electromagnetic transducer as defined in claim 1 and wherein
said spacer piece is of width of said transducing gap.

4. An electromagnetic transducer as defined in claim 1 and wherein
said spacer piece and said other pieces are of dimensions confining said transducing gap to the contiguous dimensions of said magnetic pole pieces.

5. An electromagnetic transducer as defined in claim 1 and wherein
the predetermined lengths of said other pieces are equal to the given lengths of said pole pieces.

6. An electromagnetic transducer as defined in claim 1 and wherein
the predetermined lengths of said other pieces are longer than the given lengths of said pole pieces by the length of said transducing gap.

7. An electromagnetic transducer as defined in claim 1 and wherein
said pole pieces are of ferrite, and
said other pieces are of electric conductive material.

8. An electromagnetic transducer as defined in claim 1 and wherein
said pole shoe is of given depth at said gap and is continually reduced in depth fore and aft away from said gap.

References Cited

UNITED STATES PATENTS

| | | | |
|---|---|---|---|
| 3,082,509 | 3/1963 | Lawrence | 29—155.5 |
| 2,961,495 | 11/1960 | Wallen | 179—100.2 |
| 2,832,839 | 4/1958 | Muffly | 179—100.2 |
| 2,784,259 | 3/1957 | Camras | 179—100.2 |
| 2,596,912 | 5/1952 | Nygaard | 179—100.2 |

BERNARD KONICK, *Primary Examiner.*

A. I. NEUSTADT, *Assistant Examiner.*